(No Model.)
T. A. EDISON.
ARMATURE FOR DYNAMOS OR MOTORS.
No. 465,973. Patented Dec. 29, 1891.
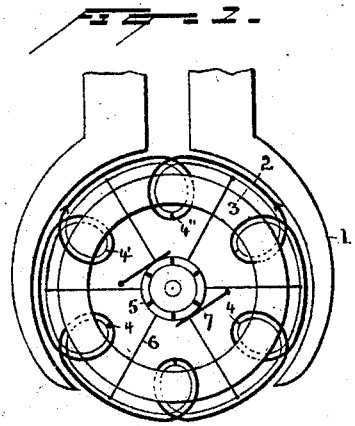
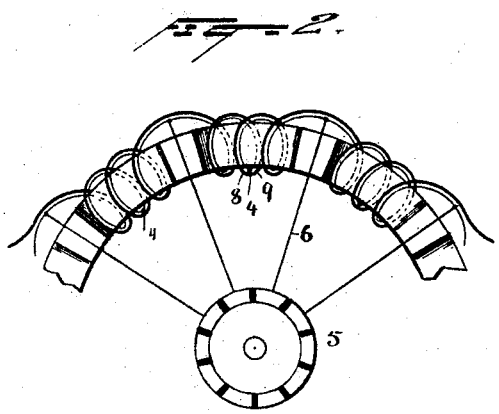
Witnesses
Inventor
T. A. Edison,
By his Attorneys
Dyer & Seely.

UNITED STATES PATENT OFFICE.

THOMAS A. EDISON, OF LLEWELLYN PARK, NEW JERSEY.

ARMATURE FOR DYNAMOS OR MOTORS.

SPECIFICATION forming part of Letters Patent No. 465,973, dated December 29, 1891.

Application filed March 23, 1891. Serial No. 386,031. (No model.)

*To all whom it may concern:*

Be it known that I, THOMAS A. EDISON, a citizen of the United States, residing at Llewellyn Park, in the county of Essex and State of New Jersey, have invented a certain new and useful Improvement in Armatures for Dynamos or Motors, (Case No. 912,) of which the following is a specification.

The present invention relates to the construction of armatures and the connection of the armature coil or coils to the segments of the commutator in such manner as to avoid or largely reduce the destructive sparking which exists in many machines as the commutator-brushes pass from one segment to another.

In patents heretofore obtained I have described this action and methods of obviating the difficulty. In Patent No. 276,233, dated April 24, 1883, this is done by making the current-collecting brushes of high-resistance material, so that the brushes do not form a circuit of low resistance between two adjacent segments of the commutator while passing from one to the other. In Patent No. 298,955, dated May 20, 1884, I have described a second way of accomplishing the result named, and in the present specification I show and describe an improved arrangement of circuit connections with the same end in view.

In the accompanying drawings, Figure 1 is a diagram showing an armature in place between the poles of a field-magnet and having a novel winding, and Fig. 2 is a detail view hereinafter described.

I have shown my improvement applied to an armature in the form of a Gramme ring. Instead of winding a single wire on the armature-core, as usual, I wind two or more conductors, preferably at the same time. When two conductors are thus wound, one is preferably a coarse copper wire and the other is a fine wire of a metal having a higher specific resistance—such as German silver—the latter being particularly for the purpose of a resistance-wire, while the former is the wire which carries the larger part of the current which is generated in the machine.

In the drawings, 1 1 are the two poles of a field-magnet.

2 is the insulated copper wire of the armature-coil, and 3 is the insulated German-silver or resistance wire. At the center of each section of the coil of the armature-ring the copper and German-silver wires are electrically connected, as indicated at 4. The armature-conductor or coils are connected to the segments of the commutator 5 by German-silver or other wires 6, leading from a point approximately midway between two of the connections 4.

7 are the commutator-brushes.

In Fig. 1, for the sake of simplicity of illustration, each coil of the armature is shown as a single turn only; but in practice there are several such turns, and in this case only the central turns 8 9, Fig. 2, would have a connection 4.

Assuming that the armature is used as a dynamo-armature, the operation will be as follows: As the armature is rotated current is generated in opposite directions in the two sides of the armature, and these currents meet approximately over or above the commutator, the direction of the current being indicated by arrows. When the current on one side reaches the section between the points 4' and 4", it will pass across the connection at 4' to the German-silver wire 3, and thence to a commutator-segment and commutator-brush, and the current on the opposite side of the armature will pass across at 4" to the German-silver wire, and thence to the commutator, thus putting a section of the resistance-wire in circuit and reducing the sparking at the commutator when the brushes pass from one segment to another.

It is not essential that the two wires be wound together for the whole length or that they should be wound together at all, and conductors of other materials than those mentioned may be employed. It will be evident that current will also be generated in the resistance-wire, which current will be in the same direction as that in the copper conductor.

Having thus described the invention, what I claim is—

1. An armature for dynamos or motors, having a winding of two wires of different specific resistances, in combination with the commutator, conductors connecting the commutator with the wire of higher resistance, and connections between the wires at intervals, substantially as described.

2. An armature for dynamos or motors, consisting of a Gramme ring wound with two wires of different specific resistances, in combination with the commutor, conductors connecting the commutator with the wire of higher resistance, and connections between the wires at intervals, substantially as described.

3. An armature for dynamos or motors, consisting of a core wound with two wires, said wires being connected at intervals and one of said wires only being connected to the commutator, substantially as described.

4. An armature for dynamos or motors, consisting of a core wound with two wires of different resistances, said wires being connected at intervals, and connections at intervals from the wire of higher resistance to commutator-segments, substantially as described.

5. An armature for dynamos or motors, the armature-coil of which is in sections and consists of two or more wires of different resistances, the wires being connected together at or near the center of each section, and a connection to the commutator at a point between the successive sections, substantially as described.

6. An armature for dynamos or motors, having a coil or wire for the current, in combination with a resistance-wire, also coiled on the armature for reducing sparking, said wires being so wound as to have currents in the same direction when the armature is in use, and a commutator, substantially as described.

This specification signed and witnessed this 4th day of March, 1891.

THOS. A. EDISON.

Witnesses:
CHARLES M. CATLIN,
JOHN F. RANDOLPH.